(12) United States Patent
Kanerva

(10) Patent No.: US 6,430,269 B1
(45) Date of Patent: *Aug. 6, 2002

(54) METHOD OF TRANSMITTING AN ACKNOWLEDGEMENT TO AN A-SUBSCRIBER

(75) Inventor: Mikko Kanerva, Helsinki (FI)

(73) Assignee: Nokia Networks Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/571,022

(22) Filed: May 15, 2000

Related U.S. Application Data

(63) Continuation of application No. PCT/FI98/00897, filed on Nov. 16, 1998.

(30) Foreign Application Priority Data

Nov. 17, 1997 (FI) .................... 974260 U

(51) Int. Cl.$^7$ .................... H04M 1/64
(52) U.S. Cl. .................... 379/67.1; 379/88.22
(58) Field of Search ............... 379/215, 201.01, 379/67.1, 88.22, 212.01, 211.02

(56) References Cited

U.S. PATENT DOCUMENTS

| | | | | |
|---|---|---|---|---|
| 4,723,273 A | * | 2/1988 | Diesel et al. | 379/210 |
| 4,837,807 A | * | 6/1989 | Szeto et al. | 379/88.13 X |
| 4,916,726 A | * | 4/1990 | Morly, Jr. et al. | 379/88.13 |
| 5,535,263 A | | 7/1996 | Blumhardt | |
| 5,680,447 A | | 10/1997 | Diamond et al. | |
| 6,052,438 A | * | 4/2000 | Wu et al. | 379/88.13 X |
| 6,072,862 A | * | 6/2000 | Srinivasan | 379/88.13 X |

FOREIGN PATENT DOCUMENTS

| | | |
|---|---|---|
| EP | 0 434 239 | 6/1991 |
| EP | 0 604 901 | 7/1994 |
| EP | 0 631 452 | 12/1994 |
| EP | 0 729 258 | 8/1996 |
| EP | 0 802 661 | 10/1997 |
| EP | 0 818 913 | 1/1998 |
| GB | 2 322 036 | 8/1998 |

* cited by examiner

Primary Examiner—Creighton Smith
(74) Attorney, Agent, or Firm—Altera Law Group, LLC

(57) ABSTRACT

The present invention relates to a method of transmitting an acknowledgement to an A subscriber in a telephone system in connection with call establishment. In order to improve transmission of information between the parties to the call establishment, communications means are arranged in the system for transmitting a predetermined message, a call associated with a terminating call is received from the A subscriber, and the communication means are activated via the user interface of a subscriber station to transmit said acknowledgement message to the A subscriber.

12 Claims, 2 Drawing Sheets

METHOD OF TRANSMITTING AN ACKNOWLEDGEMENT TO AN A-SUBSCRIBER

Figure 1:
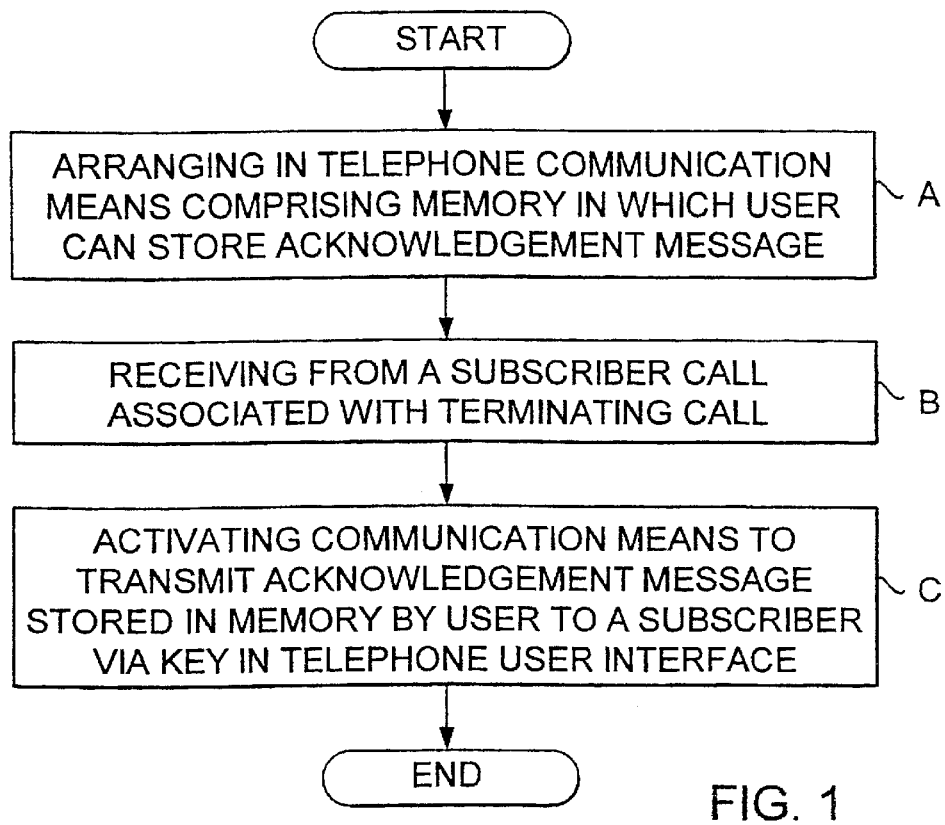

This application is a continuation of PCT/FI98/00897, filed Nov. 16, 1998.

The present invention relates to a method of transmitting an acknowledgement to an A subscriber in a telephone system in connection with call establishment. The invention further relates to a telephone system comprising subscriber stations and means for establishing a call between the subscriber stations of the system. Moreover, the invention further relates to a subscriber station of a telephone system comprising a user interface, indication means for indicating a call associated with a terminating call, and means for establishing a connection with another party to the terminating call in response to procedures performed by the user via the user interface.

The invention relates to transmission of information between the subscriber stations participating in the call establishment. It is to be noted that the invention can also be applied in a fixed telephone network although it is described by way of example with reference to a mobile telephone system.

In the known telephone systems, a B subscriber has an extremely limited number of options to choose from when he or she is unable to answer his or her ringing telephone. In such a situation, a subscriber in a GSM (Global System for Mobile communications) system, for example, can interrupt a call via a key in the telephone (UDUB, User Determined User Busy) or, alternatively, wait for the A subscriber to interrupt the call or for the call to be forwarded to the B subscriber's answering machine (CFNRy, Call Forwarding on No Reply).

The options described above provided by known telephone systems for the use of the B subscriber fail to be sufficient in all situations. If, for example, the B subscriber is willing to answer a call but he or she is unable to do it immediately but only in a little while, the call may already have been connected to an answering machine or the A subscriber may already have interrupted the call before the B subscriber has had the time to answer.

In the known telephone systems, an A-subscriber-identifier may be transmitted to the B subscriber in connection with a terminating call, whereby the B subscriber can see on the display device in his or her telephone who is trying to call him or her. In the known telephone systems, however, the B subscriber is unable to indicate to the A subscriber that he or she has noticed the call but that he or she has no time to answer it at that particular moment.

An object of the present invention is to solve the problems described above related to the known telephone systems and improve the user-friendliness of the known telephone systems by increasing transmission efficiency of information between the parties to call establishment. This object is achieved by the method of the invention, which is characterized by arranging in the system communication means for transmitting a predetermined acknowledgement message, receiving from the A subscriber a call associated with a terminating call and activating via a user interface of a subscriber station the communication means to transmit said acknowledgement message to the A subscriber in connection with the call establishment of the terminating call.

The invention further relates to a telephone system in which the method of the invention can be applied. The telephone system of the invention is characterized in that the system comprises: at least one subscriber station comprising means for activating a predetermined acknowledgement sequence in connection with the call establishment of a terminating call in response to procedures performed by a user of the subscriber station via a user interface, and communication means responsive to the activation of the acknowledgement sequence for transmitting a predetermined acknowledgement message to another party to the call establishment.

Moreover, the invention further relates to a subscriber station of a telephone system by which the method of the invention can be applied and which is suited for use in the telephone system of the invention. The subscriber station of the invention is characterized in that the user interface of the subscriber station comprises means for activating a predetermined acknowledgement sequence in connection with the call establishment of the terminating call in response to procedures performed by the user via the user interface, which acknowledgement sequence activates the transmission of a predetermined acknowledgement message to the other party to the call establishment.

The invention is based on the idea that the user-friendliness of the telephone system increases significantly when the user interfaces of the subscriber stations are equipped with means via which the B subscriber can activate an acknowledgement sequence, which makes the subscriber station of the B subscriber or one of the network elements of the system to transmit a predetermined acknowledgement message to the A subscriber in connection with the call establishment.

The use of the mobile telephone is provided with an opportunity to indicate to the A subscriber that he or she will answer the call for example by arranging a key in the keypad of a mobile telephone and pressing the key in connection with a terminating call when a text message "Please wait, I'll answer shortly" which is stored in the memory of the telephone is transmitted to the A subscriber. This is particularly useful if, at the particular moment, the B subscriber happens to be somewhere (at a meeting, for example) where it is extremely inconvenient to talk. The user of the mobile telephone can also be provided with the opportunity, to scan the messages stored in the memory manually and select the most suitable message to be transmitted.

Alternatively, the telephone can be provided with a key, and to press this key in connection with the call establishment results in the transmission of a voice notification stored in the telephone exchange or a network element located in connection with it to the A subscriber. If the telephone of the B subscriber and the telephone system in question are able to transmit the A-subscriber-identifier to the display of the B subscriber's telephone so as to enable the B subscriber to identify who is trying to call him or her, the voice notification in question can notify the A subscriber that "I've noticed your call attempt, but I'm unable to answer at the moment, I'll call you back shortly", for example.

A preferred embodiment of the method in accordance with the invention is characterized by arranging in the system communication means for transmitting a predetermined acknowledgement message, and activating via the user interface of a subscriber station the communication means to transmit said acknowledgement message to the A subscriber in response to the reception of a call associated with a terminating call. In this preferred embodiment of the method in accordance with the invention, the user of the telephone can in advance store a desired message, for example "I'm at a meeting till noon" and activate the communication means to transmit the message automatically to all A subscribers calling him or her.

The most significant advantages of the solution of the invention are improved user-friendliness and a higher probability that a call attempt will succeed.

The preferred embodiments of the method, telephone system and subscriber station are disclosed in the attached dependent claims 2, 4 to 8 and 10 and 11.

Figure 2:
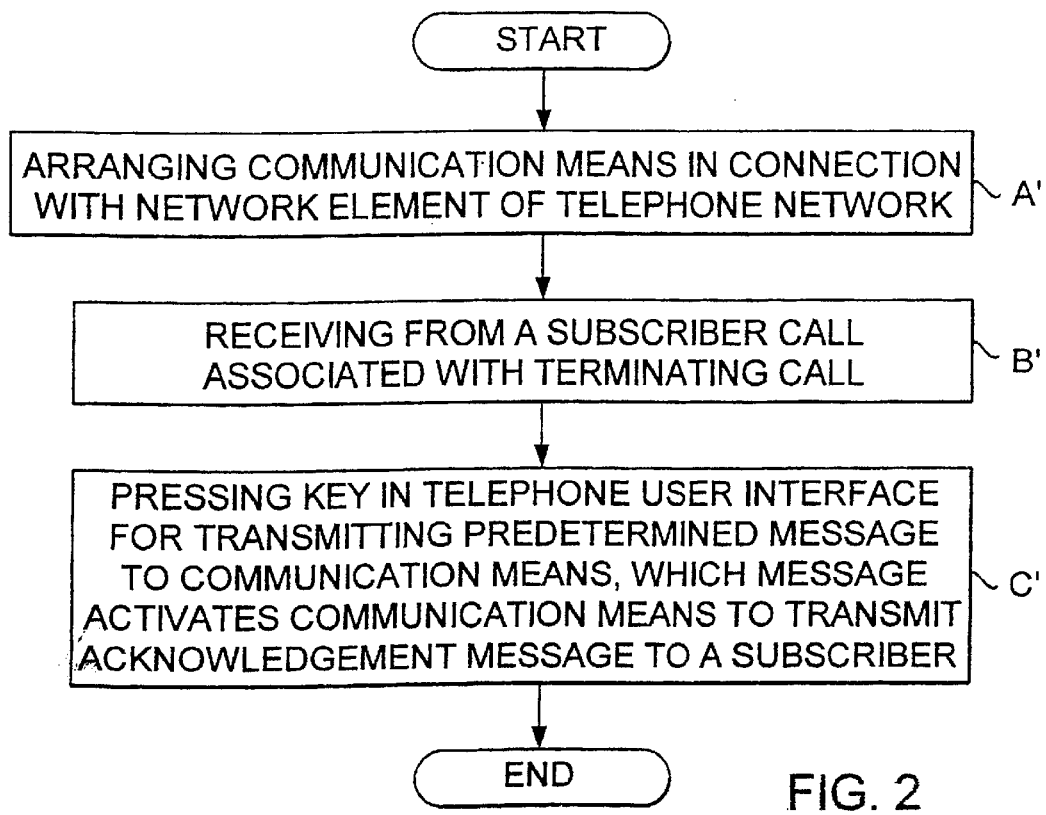
Figure 3:
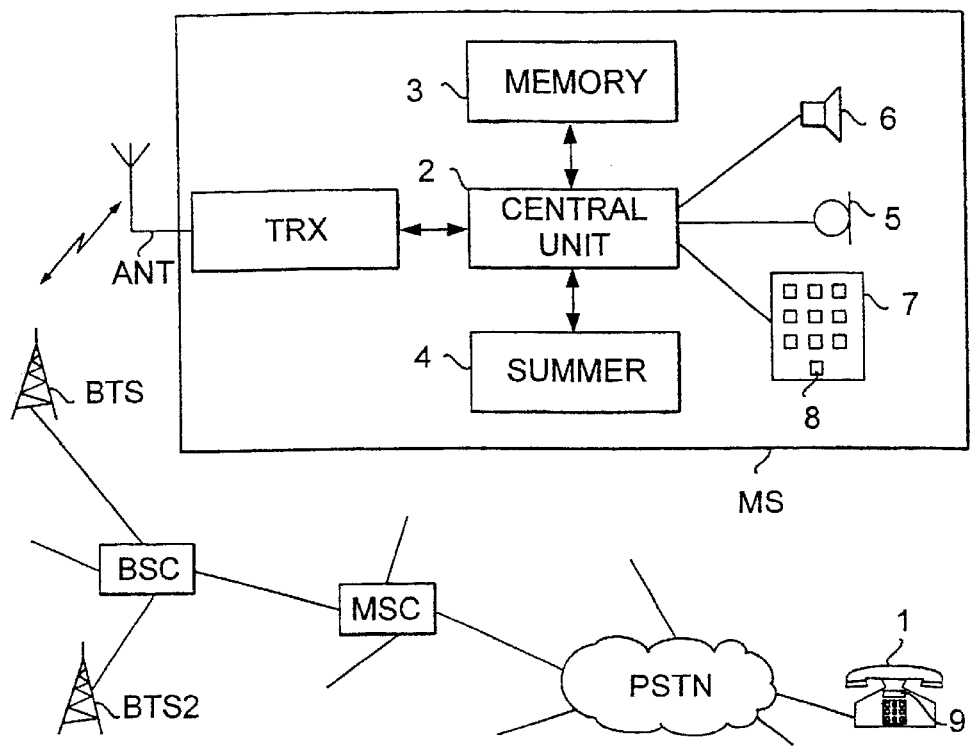
Figure 4:
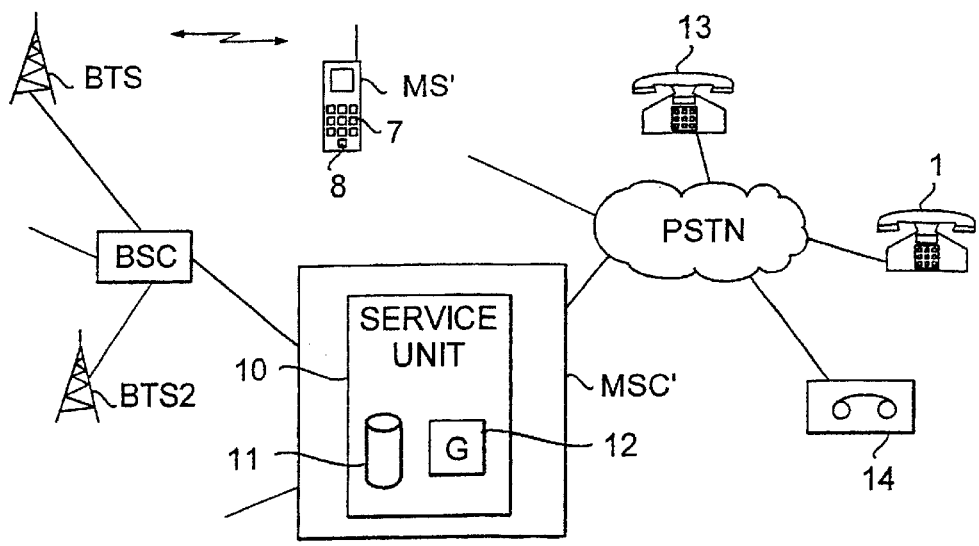

The invention will be described in the following in closer detail by way of example with reference to the accompanying drawings, in which FIG. 1 shows a flow diagram of a first preferred embodiment of the method in accordance with the invention, FIG. 2 shows a flow diagram of a second preferred embodiment of the method in accordance with the invention, FIG. 3 shows a block diagram of a first preferred embodiment of the telephone system in accordance with the invention, and FIG. 4 shows a block diagram of a second preferred embodiment of the telephone system in accordance with the invention.

FIG. 1 shows a flow diagram of a first preferred embodiment of the method in accordance with the invention. The flow diagram of FIG. 1 can be applied in a GSM mobile telephone system, for example.

In block A, communication means having memory in which the user can store an acknowledgement message are arranged in a telephone. Alternatively, the communication means can be arranged in the memory of a peripheral connected to the telephone. When the telephone is a GSM one, an existing memory, such as the specific memory of the GSM telephone for example or the memory of an SIM (Subscriber Identity Module) card can be utilized as the memory of the communication means, provided that the capacity of the memory in question is sufficient. In that case, the GSM telephone should be programmed so as to enable a message stored in the memory to be forwarded in a particular situation (in connection with the call establishment of a terminating call) over a radio path by pressing one of the keys of the telephone.

The acknowledgement message can, for example, consist of a voice notification dictated by the user or, alternatively, a text message fed by the user via the keypad, including for example "Please wait, I'll answer shortly".

In block B, a call associated with a terminating call is received from the A subscriber.

In block C, an acknowledgement sequence is activated by pressing a key in the telephone defined for the purpose. The activation of the acknowledgement sequence makes the communication means to transmit an acknowledgement message stored in the memory to the A subscriber.

In accordance with the invention, the message stored in the memory of the mobile telephone can be transmitted to the A subscriber with no need to establish a call to the A subscriber. This can be carried out, for example, in such a manner that the acknowledgement message in text form stored in the memory is forwarded by a USER-TO-USER element according to part 04.08 of the GSM specifications, included in a SETUP, ALERTING, CONNECT, DISCONNECT, RELEASE or RELEASE COMPLETE message, whereby it is transmitted to the A subscriber via the network elements of the GSM mobile telephone system. According to the GSM specifications, optional data can be included in the USER-TO-USER element in question. Consequently, the A subscriber is provided with the acknowledgement message stored in the memory on the display of his or her telephone. Alternatively, the A subscriber's telephone can be equipped with a speech synthesizer which generates a speech message via a speaker from the text message transmitted to it. This embodiment of the invention is preferable in being applicable in accordance with the GSM specifications. The acknowledgement message can be transmitted as described above, similarly with no need to establish a call in a fixed telephone network, provided that the connections between the A subscriber and the B subscriber support the transmission of a USER-TO-USER element (operates when ISDN connections are used, for example).

Alternatively, the acknowledgement message can consist of an audio signal, such as a queue tone or a speech message, generated by the B subscriber's telephone. In such a case, when the B subscriber presses the acknowledgement key of his telephone, the call is normally connected but the microphone of the B subscriber's telephone is muted and the telephone starts generating a queue tone or a speech message to the A subscriber so as to make him or her understand that he or she should wait for a while to be answered.

FIG. 2 shows a flow diagram of a second preferred embodiment of the invention.

In block A', communication means are arranged in connection with one of the network elements of the telephone system. If the system is a GSM one, for example, the communication means can be arranged in connection with a mobile services switching centre.

In block B', a call associated with a terminating call is received from the A subscriber.

In block C', a key in the user interface of the telephone is pressed to activate an acknowledgement sequence. The acknowledgement sequence produces the transmission of a predetermined message to the communication means. To enable this, a new message which activates the communication means to transmit an acknowledgement message to the A subscriber should be added to the signalling of the telephone system in question.

For example an audio signal, such the queue tone used in a public telephone network, can be utilized as an acknowledgement message, in which case the A subscriber notices that he or she should wait for a while to be answered. Alternatively, a speech message which indicates the options available to the A subscriber can be used as an acknowledgement message. In other words, the A subscriber can be connected to a network element which enables the A subscriber to wait until the B subscriber answers, to leave a speech message in the B subscriber's answering machine or to establish a connection to somebody else, such as the B subscriber's secretary. The A subscriber can indicate the alternative he or she has selected to the network element by DTMF (Dual Tone Multi-Frequency) signals, for example.

FIG. 3 illustrates a first preferred embodiment of the telephone system in accordance with the invention.

A mobile telephone MS of FIG. 3, which can be a GSM system mobile telephone, for example, comprises means in a manner known per se for establishing a connection for example to a subscriber station 1 of a fixed telephone network via a base station BTS, a base station controller BSC and a mobile services switching centre MSC. The means include an antenna ANT, a radio part TRX, a central unit 2, a memory 3, a summer 4 (for indicating a terminating call), a speaker 6, a microphone 5 and a keypad 7.

In the case of FIG. 3, it is assumed that the user of the mobile station MS is situated in a place where he or she is unable to answer his or her telephone immediately when the subscriber 1 in the fixed telephone network calls him or her. When the user of the mobile station hears an audio signal produced by the summer 4 of the mobile telephone, he or she presses a key 8 in the keypad 7 of the mobile station to activate an acknowledgement sequence and to transmit an acknowledgement message to the subscriber station 1.

The central unit 2 of the mobile telephone detects that the key 8 has been pressed in connection with a terminating call, in which case it retrieves from the memory 3 the text message "Please wait, I'll answer shortly" stored there earlier by the user via the keypad 7. Alternatively, in this stage, the mobile telephone can be programmed to provide the user with an opportunity to write a new message via the keypad 7 or to scan the messages in the memory and select the most suitable message to be transmitted. Consequently, the user who sees the A-subscriber-identifier via the display of the mobile telephone and knows who is calling him or her can transmit an acknowledgement message designated specifically to the person in question.

The central unit 2 transmits the text message retrieved from the memory 3 or written by the user to the subscriber station 1 via the radio part TRX as an acknowledgement message which is transmitted from the mobile telephone system to the subscriber station 1 in the fixed network, the user of the subscriber station 1 being able to see it on a display 9 of the telephone 1. The subscriber station 1 can be connected to a fixed telephone network PSTN (Public Switched Telephone Network) via an ISDN (Integrated Service Digital Network) connection, for example.

As distinct from the above, the mobile telephone MS can be programmed to establish a connection to the A subscriber 1 in a normal way when its user presses the key 8 to activate the acknowledgement sequence and to transmit the acknowledgement message. In such a case, the microphone 5 of the mobile station becomes mute (or it can be muted) and the central unit 2 transmits the message stored earlier in the memory 3 of the mobile station MS by the user via the radio part TRX and over the speech path to the A subscriber. The message can be a speech message or the mobile station can comprise a signal generator which produces, for example, a queue tone to the A subscriber 1. Alternatively, the B subscriber's mobile station can comprise a speech synthesizer which produces a speech message from the message in text form stored in the memory by the user, in which case the speech message in question is transmitted to the A subscriber.

On the basis of the speech message or the changed audio signal (queue tone), the A subscriber notices that he or she should wait for a while to be answered. In this case, in order not to make the A subscriber 1 pay excessively for the queuing activated by the B subscriber, the queuing time can be charged from the B subscriber.

Eventually, when the user of the mobile telephone MS is ready to start the call, he or she represses the key 8 of the mobile telephone, whereby the call is connected, or, alternatively, if the call has already been connected earlier the microphone 5 of the mobile telephone is activated, and the signal generator stops generating the queue tone. If the queuing time has been charged from the B subscriber, i.e. the user of the mobile telephone MS, the radio part TRX transmits a predetermined message over the radio path to the mobile services switching centre MS, whereby in future, the call will be charged in the same manner as in the known mobile telephone systems.

FIG. 4 shows a block diagram of a second preferred embodiment of the telephone system in accordance with the invention.

FIG. 4 corresponds to the system of FIG. 3 in other respects but in FIG. 4, the communication means for transmitting the acknowledgement message are placed in a service unit 10 arranged in connection with a mobile services switching centre MSC'.

When the subscriber 1 in the fixed network places a call to a mobile telephone MS' and the user of the mobile telephone MS'has no time to answer, he or she presses the key 8 in the keypad 7 of the mobile telephone to activate the acknowledgement sequence. The mobile telephone MS'then transmits the message reserved for the particular purpose over the radio path via the base station BTS and the base station controller BSC to the mobile services switching centre MSC'. The mobile services switching centre then connects the A subscriber's call to the service unit 10.

The service unit 10 produces an acknowledgement message to the subscriber station 1. The acknowledgement message can consist of a speech message or a text message stored earlier by the user of the mobile telephone MS'in a memory 11 of the service unit. Alternatively, a signal generator 12 of the service unit can produce a queue tone to the subscriber 1. Furthermore, as the acknowledgement message, a speech message produced by the service unit 10 can also be used which informs the subscriber 1 of the available options, which can include:

1) wait until the B subscriber has the time to answer, 2) let the call be connected to the B subscriber's answering machine 14, or 3) let the call be connected to the telephone 13 of the B subscriber's secretary.

The A subscriber can make the selection for example by using DTMF signals via the keypad of his or her telephone 1, in which case the service unit 10 and the mobile services switching centre MSC' serve to connect the call in a manner selected by the A subscriber.

It is to be understood that the description above and the accompanying drawings are only intended to illustrate the present invention. It will be obvious to those skilled in the art that the invention can be varied and modified in many ways without departing from the scope and spirit of the invention disclosed in the attached claims.

What is claimed is:

1. A method of transmitting an acknowledgement to an A subscriber in a telephone system in connection with call establishment, the method comprising:

arranging in a system a communication device for transmitting a predetermined acknowledgement message;

receiving at a subscriber station from an A subscriber a call associated with a terminating call;

activating via a user interface of said subscriber station said communication device to transmit said acknowledgement message to the A subscriber; and transmitting said acknowledgement message to the A subscriber in a USER-TO-USER element without establishing a call to said A subscriber.

2. The method as claimed in claim 1, wherein the communication device transmits the acknowledgement message which indicates to the A subscriber that the terminating call will shortly be answered.

3. A telephone system comprising:

subscriber stations and a controller for establishing a call between the subscriber stations of the system;

at least one subscriber station for activating a predetermined acknowledgement sequence in connection with the call establishment of a terminating call from another subscriber station in response to procedures performed by a user of said at least one subscriber station via a user interface; and a communication device responsive to the activation of the acknowledgement sequence for transmitting a predetermined acknowledgement message to said another subscriber station in a USER-TO-USER element without establishing a call to said another subscriber station.

4. The telephone system as claimed in claim 3, wherein the communication device is coupled to a network element of the telephone system, and that said at least one subscriber station transmits, in order to activate the acknowledgement sequence, a predetermined message to said network element which transmits said acknowledgement message in response to said message.

5. The telephone system as claimed in claim 3, wherein the communication device is in said at least one subscriber station.

6. The telephone system as claimed in claim 3, wherein the communication device transmits an audio message to said another subscriber station.

7. The telephone system as claimed in claims 3, wherein the communication device transmits a text message to said another subscriber station.

8. The telephone system as claimed in claim 3, wherein the system transmits an A-subscriber-identifier associated with the terminating call to said at least one subscriber station in connection with the call establishment, that said at least one subscriber station comprises a display for showing the A-subscriber-identifier to the user of said at least one subscriber station, and that the communication device transmits the acknowledgement message which indicates to said another subscriber station that the user of said another subscriber station has been identified.

9. A subscriber station of a telephone system comprising:
   a user interface; and
   an indicator for indicating a call associated with a terminating call from another subscriber station, wherein the user interface of the subscriber station comprises an acknowledgment device for activating a predetermined acknowledgement sequence in connection with the call establishment of the terminating call in response to procedures performed by the user via the user interface, which acknowledgement sequence activates the transmission of a predetermined acknowledgement message to said another subscriber station in a USER-TO-USER element without establishing a call to said another subscriber station.

10. The subscriber station as claimed in claim 9, wherein the subscriber station comprises memory for storing the acknowledgement message defined by the user and central unit for retrieving it from the memory and for transmitting it to said another subscriber station in response to the activation of the acknowledgement sequence.

11. The subscriber station as claimed in claim 9, wherein the subscriber station transmits a predetermined message to a network element of the telephone network in response to the activation of the acknowledgement sequence, which network element is responsive to said message for transmitting the acknowledgement message to said another subscriber station.

12. A method for transmitting an acknowledgement to an A subscriber in a telephone system in connection with a call establishment, comprising:
   arranging in the system communication device for transmitting a predetermined acknowledgement message, in a USER-TO-USER element without establishing a call; and
   activating via the user interface of a B subscriber the communication device to transmit said acknowledgement message to the A subscriber in response to the reception of a call associated with a terminating call.

\* \* \* \* \*